US008824742B2

(12) United States Patent
Skaff et al.

(10) Patent No.: US 8,824,742 B2
(45) Date of Patent: Sep. 2, 2014

(54) OCCUPANCY DETECTION FOR MANAGED LANE ENFORCEMENT BASED ON LOCALIZATION AND CLASSIFICATION OF WINDSHIELD IMAGES

(75) Inventors: Sandra Skaff, Rochester, NY (US); Beilei Xu, Penfield, NY (US); Peter Paul, Webster, NY (US); Craig Saunders, Grenoble (FR); Florent Perronnin, Domene (FR)

(73) Assignee: Xerox Corporation, Norwalk, CT (US)

( * ) Notice: Subject to any disclaimer, the term of this patent is extended or adjusted under 35 U.S.C. 154(b) by 206 days.

(21) Appl. No.: 13/527,228

(22) Filed: Jun. 19, 2012

(65) Prior Publication Data

US 2013/0336538 A1    Dec. 19, 2013

(51) Int. Cl.
*G06K 9/00* (2006.01)
*G06K 9/46* (2006.01)
*G06K 9/62* (2006.01)

(52) U.S. Cl.
USPC ........................... 382/104; 382/190; 382/224

(58) Field of Classification Search
CPC ...................... G06K 9/00362; G06K 9/00832
USPC ................................................ 382/104, 224
See application file for complete search history.

(56) References Cited

U.S. PATENT DOCUMENTS

| | | | |
|---|---|---|---|
| 7,055,639 B2 | 6/2006 | Kiribayashi | |
| 7,786,897 B2 * | 8/2010 | Alves | 340/937 |
| 7,898,402 B2 * | 3/2011 | Odate et al. | 340/438 |
| 8,013,760 B2 | 9/2011 | Turnock et al. | |
| 2005/0190953 A1 * | 9/2005 | Nagahashi et al. | 382/118 |
| 2012/0069183 A1 * | 3/2012 | Aoki et al. | 348/148 |
| 2012/0147194 A1 | 6/2012 | Wang et al. | |
| 2012/0200682 A1 | 8/2012 | Mestha et al. | |

OTHER PUBLICATIONS

Paul, Peter; Burry, Aaron M.; Wang, Yuheng; Kozitsky, Vladimir "Application of the SNoW machine learning paradigm to a set of transportation imaging problems" Proceedings of the SPIE, vol. 8305, article id. 830512, 11 pp. (2012).*
Xiaoli Hao; Houjin Chen; Jie Li, "An Automatic Vehicle Occupant Counting Algorithm Based on Face Detection," Signal Processing, 2006 8th International Conference on , vol. 3, no., pp. 16-20 2006.*
Nilsson et al., "Face Detection Using Local SMQT Features and Split Up SNoW Classifier", IEEE International Conference on Acoustics, Speech, and Signal Processing, 2007.
Viola et al., "Robust Real-Time Face Detection", International Journal of Computer Vision, vol. 57, pp. 137-154, 2007.

(Continued)

*Primary Examiner* — Utpal Shah
(74) *Attorney, Agent, or Firm* — Fay Sharpe LLP

(57) ABSTRACT

A system for detecting a vehicle occupancy violation includes an image capture module that acquires an image including a vehicle cabin from a camera positioned to view oncoming traffic. The system includes a violation determination device, which includes a feature extraction module that processes the image pixels for determining an image descriptor. The process is selected from a group consisting of a Successive Mean Quantization Transform; a Scale-Invariant Feature Transform; a Histogram of Gradients; a Bag-of-Visual-Words Representation; a Fisher Vector Representation; and, a combination of the above. The system further includes a classifier that determines a distance that the vehicle image descriptor/representation is positioned in the projected feature space relative to a hyper-plane. The classifier determines whether the distance meets a threshold and classifies the image when the threshold is met. A processor implements the modules. A graphic user interface outputs the classification.

19 Claims, 9 Drawing Sheets

(56) References Cited

OTHER PUBLICATIONS

U.S. Appl. No. 13/215,401, filed Aug. 23, 2011, by Fan et al., entitled "Front Seat Vehicle Occupancy Detection Via Seat Pattern Recognition".

Birch et al., "Automated Vehicle Occupancy Monitoring", Optical Engineering, vol. 43, pp. 1828-1832, 2004.

Perez-Jimenez et al., "High Occupancy Vehicle Detection", Structural, Syntactic and Statistical Pattern Recognition Journal, vol. 5342, pp. 782-789, 2008.

Csurka et al., "Visual Categorization with Bags of Keypoints", ECCV SLCV, 2004.

Perronnin et al., "Fisher Kernels on Visual Vocabularies for Image Categorization", CVPR, 2007.

Perronnin et al., "Improving the Fisher Kernel for Large-Scale Image Classification", ECCV, 2010.

U.S. Appl. No. 13/312,414, filed Dec. 6, 2011, by Edul N. Dalai et al., entitled "Vehicle Occupancy Detection Via Single Band Infrared Imaging".

Pavlidis et al., "A Vehicle Occupant Counting System Based on Near-Infrared Phenomenology and Fuzzy Neural Classification", IEEE Transactions on Intelligent Transportation Systems, vol. 1, No. 2, Jun. 2000, pp. 72-85.

\* cited by examiner

OCCUPANCY DETECTION FOR MANAGED LANE ENFORCEMENT BASED ON LOCALIZATION AND CLASSIFICATION OF WINDSHIELD IMAGES

BACKGROUND

The present disclosure relates to an image-based method and system for detecting vehicle occupancy violations for managed lane enforcement. The disclosure finds application in traffic management. However, it is appreciated that the present exemplary embodiments are also amendable to other like applications.

One mechanism used to reduce congestion on busy commuter highway corridors is to impose limits on the use of a lane. For example, certain occupancy rules may be required for vehicles to use a managed lane. Examples of managed lanes include High Occupancy Vehicle (HOV) lanes and High Occupancy Tolling (HOT) lanes. In HOV lanes, vehicles are required to carry at least two occupants in order to use the lane. In HOT lanes, however, single occupant vehicles can pay a toll to use the lane. Several advantages result from the use of managed lanes. Vehicles can reach destinations in a timelier manner and the Department of Transportation (DOT) can generate revenue for roadway maintenance.

One challenge associated with managed lanes is enforcement against violations. Traditionally, enforcement of violations is performed by traffic law enforcement officers that make traffic stops in response to visual detections. However, this method is costly in labor required for observation and in fines lost from undetected violations. For example, certain studies report an estimated ninety percent of violators can escape detection, which results in lost revenue, estimated in the billions, for the DOT. Furthermore, it exposes officers to the dangers of oncoming traffic while making the traffic stop.

In an effort to reduce costs and improve efficiency, municipalities are exploring the use of new technologies for automating enforcement methods. In one example, radio frequency identification (RFID) transponders are used to assess tolls in HOT lanes. These transponders send signals based on the position of a switch located in the vehicle. The switch position indicates whether the vehicle currently contains a single occupant or multiple occupants. One drawback with this automated method is that it relies on the compliance of a driver. Because the switch is manually set by the driver, compliance becomes voluntary.

Another example of a conventional automated enforcement method performs object recognition by searching for objects based on image content assumptions. This method is based on the assumption that different objects within the image, such as faces, seats, and seat belts, are visible to the camera. Therefore, parts of the image are analyzed to determine a location of the objects and appearance characteristics, such as color, size, texture, and shape, etc., of the objects. In one example, the appearance characteristic can include spectral features, which can be extracted for detecting pixels belonging to the skin of an occupant. The extraction of the appearance characteristics can be performed via a feature representation of the object. The objects in the image that have characteristics that match a reference object are associated as being the same as the reference object. In other words, the object is labeled as being an occupant or a seat, etc.

One problem associated with conventional object detection is that variations in the captured image can result in incorrect classifications. For example, the object recognition approach may incorrectly classify an image as having a single-occupant when a passenger is leaning forward. In this instance, shown in FIGS. 1A and 1B, the appearance characteristics that are extracted from the image match those of a seat and fail to match reference features corresponding to a face. FIGS. 2A and 2B show another variation in which an occupant is facing sideways when the reference object used in the object recognition approach is adapted to detect forward-facing occupants. In this instance, the vehicle is incorrectly classified as having a single-occupant because the driver is only identified. In yet another example, shown in FIGS. 3A and 3B, the object recognition approach can incorrectly classify a vehicle as having a single occupant when it fails to identify, as an object, a rear-seated passenger sitting behind the driver.

Accordingly, there is a need for an improved and more accurate automatic or semi-automatic enforcement of managed lanes. A system and a method is needed that classifies an entire windshield and/or cabin region instead of searching for specific objects situated inside parts of the image using appearance and spectral features. More specifically, there is needed an approach that makes no assumptions about the content of images in advance of the process.

BRIEF DESCRIPTION

One embodiment of the application relates to a method and a system for detecting a vehicle occupancy violation. The method includes acquiring an image including a vehicle from an image capture device positioned to view oncoming traffic. The method further includes processing pixels of the image for computing a feature vector describing a cabin region of the vehicle. The method also includes applying the feature vector to a classifier for classifying the image into respective classes including at least classes for a candidate violator and a non-violator. The method includes outputting the classification.

Another embodiment of the application relates to a system for detecting a vehicle occupancy violation. The system includes an image capture module that is adapted to acquire an image including a cabin of a vehicle from an image capture device positioned to view oncoming traffic. The system includes a violation determination device that is adapted for processing the image. The device includes a feature extraction module that is adapted to process pixels of the image for determining a descriptor of the image. The device performs a process selected from a group consisting of a Successive Mean Quantization Transform (SMQT); a Scale-Invariant Feature Transform (SIFT); a Histogram of Gradients (HOG); a Bag-of-Visual-Words Representation; a Fisher Vector (FV) Representation; and, a combination of the above. The system further includes a classifier that is adapted to separate representations corresponding to violating and non-violating images. The classifier is further adapted to compute a score that reflects a likelihood that the image corresponds to a violating vehicle. The classifier is adapted to classify the image in response to the score meeting and exceeding the threshold. The system further includes a processor adapted to implement the modules. A graphic user interface is adapted to output the classification.

DETAILED DESCRIPTION

The present disclosure relates to a method and a system for automatically detecting vehicle occupancy violations for managed lane enforcement. The system analyzes images that are acquired from a camera having a visible-light blocking filter that is sensitive to only near-infrared (NIR) light. The system then performs the method in two stages. In a first stage, the windshield region is located and extracted from the original image. In a second stage, a feature vector is calculated for representing the windshield region. The feature vector is applied to a classifier, which indicates whether the vehicle is violating or is a candidate of violating the managed lane requirement. A thresholding parameter can be applied to the image by the classifier for further determining whether the system performs the classification process. In another aspect of the disclosure, the system can be continually retrained while on-line using labeled ground truth from a manual verification of candidate violations.

Figure 1A:
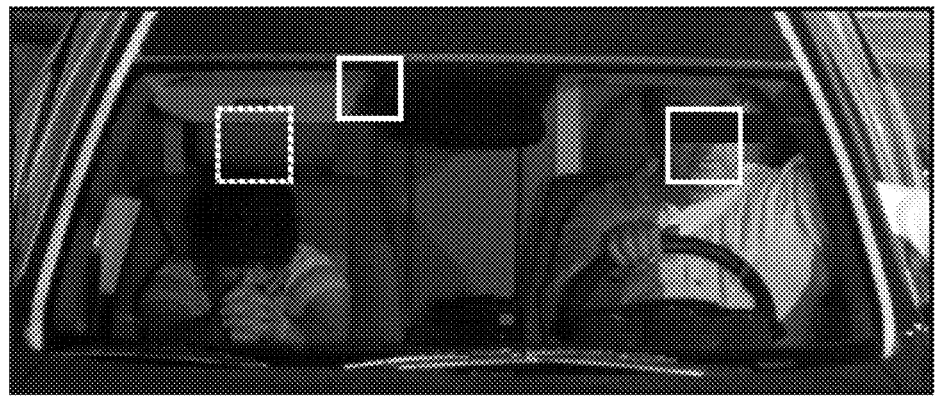
FIGS. 1-3 show example image variations that result in incorrect classifications when using an object recognition approach in the PRIOR ART.
Figure 1B:
Figure 2A:
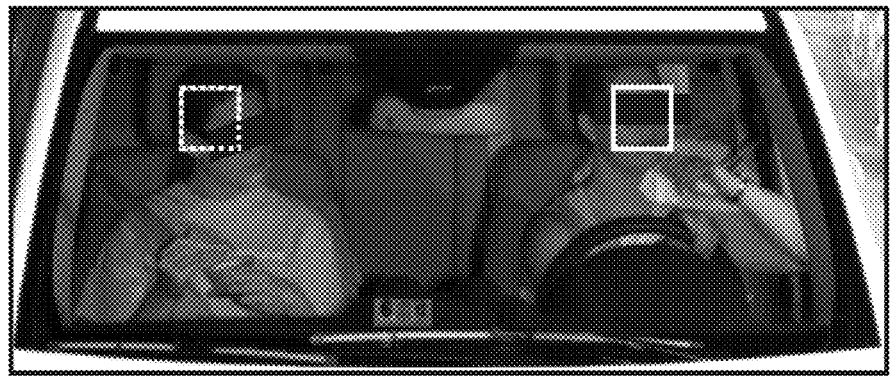
Figure 2B:
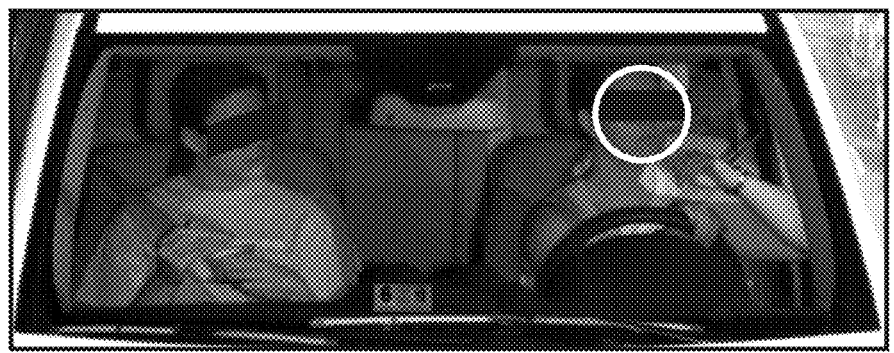
Figure 3A:
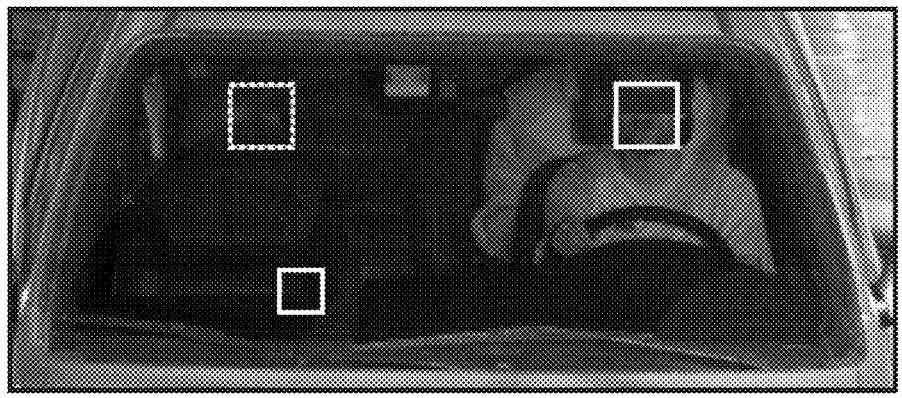
Figure 3B:
Figure 4:
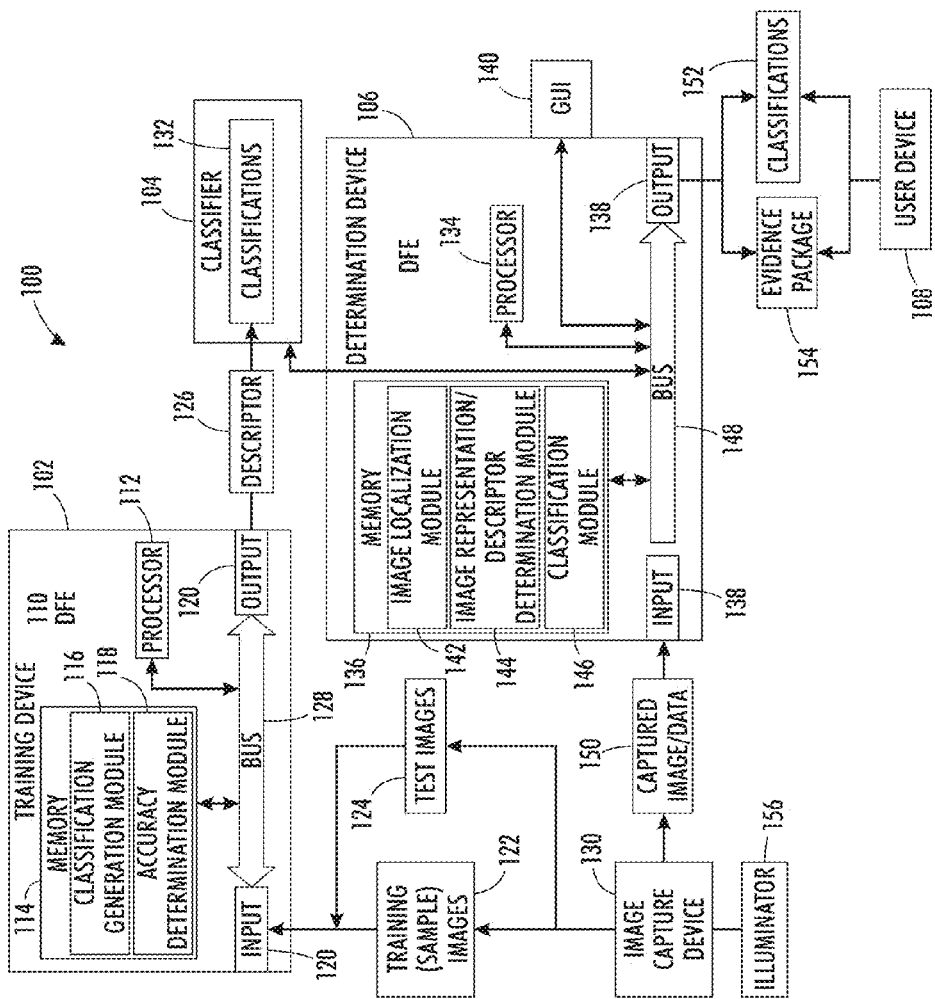
FIG. 4 is a schematic illustration of a managed lane enforcement system in one exemplary embodiment.

FIG. 4 is a schematic illustration of a managed lane enforcement system 100 in one exemplary embodiment. The system 100 includes a training device 102 (herein also referred to as a 'classifier 102'), a storage device 104, and a violation determination device 106, which may be linked together by communication links, referred to herein as a network. In one embodiment, the system 100 may be in further communication with a user device 108. These components are described in greater detail below.

The training device 102 illustrated in FIG. 4 includes a controller 110 that is part of or associated with the training device 102. The exemplary controller 110 is adapted for controlling a training of the managed lane enforcement system 100 by generating at least one descriptor that can be later compared to descriptors computed from captured images. The controller 110 includes a processor 112, which controls the overall operation of the training device 102 by execution of processing instructions, which are stored in memory 114 connected to the processor 112.

The memory 114 may represent any type of tangible computer readable medium such as random access memory (RAM), read only memory (ROM), magnetic disk or tape, optical disk, flash memory, or holographic memory. In one embodiment, the memory 114 comprises a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processor 112, in addition to controlling the operation of the training device 102, executes instructions stored in memory 114 for performing the parts of the method outlined in FIG. 7 that is performed at the system 100. In some embodiments, the processor 112 and memory 114 may be combined in a single chip.

The training device 102 may be embodied in a networked device, although it is also contemplated that the training device 102 may be located elsewhere on a network to which the system 100 is connected, such as on a server, networked computer, or the like, or distributed throughout the network or otherwise accessible thereto. The classifier can be a Support Vector Machine (SVM), which is trained on a set of labeled windshield images according to the instructions contained in the memory 114. In particular, the memory 114 stores a classification generation module 116, which is adapted to acquire training images with labels, group images with the same label in a set, calculate features using a set of labeled data, and associate a set of features with a select classification, compute a signed distance between the vehicle image kernel transformed representations (i.e., feature vector/descriptor) in the projected feature space and a hyper-plane boundary, compare the unsigned distance to a threshold, and classify the image based on results of the comparison. Embodiments are contemplated wherein these instructions can be stored in one module. The modules 116, 118 will be later described with reference to the exemplary method.

The software modules as used herein, are intended to encompass any collection or set of instructions executable by the training device 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions.

With continued reference to FIG. 4, the training device 102 also includes one or more communication interfaces, such as network interfaces, for communicating with external devices. The communication interfaces 120 may include, for example, a modem, a router, a cable, and/or Ethernet port, etc. The communication interface 120 is adapted to receive sample (hereinafter "training") images 122 and test images 124 as input and provide at least one descriptor and/or class association (assigned to a set of descriptors) 126 as output. In contemplated embodiments, one communication interface can receive the input and provide the output. The various components of the training device 102 may be all connected by a bus 128.

The training device 102 may include one or more special purpose or general purpose computing devices, such as a server computer or digital front end (DFE), or any other computing device capable of executing instructions for performing the exemplary method.

FIG. 4 further illustrates the training device 102 connected to an image capture device 130 for inputting and/or receiving the training and test images 122, 124 in electronic format. The image capture device 130 may include a camera that is selected to provide the training and test images 122, 124 or it can be an input device adapted to transmit the images captured by a camera to the training device 102. For example, an input device can include a scanner, a computer, or the like. In another embodiment, the image data may be input from any suitable source, such as a workstation, a database, a memory storage device, such as a disk, or the like. The input device can be in communication with the controller 102 containing the processor 112 and memories 114.

With continued reference to FIG. 4, the managed lane enforcement system 100 includes a storage device 104 in communication with the training device 102. In a contemplated embodiment, the training device 102 can be in communication with a server (not shown) that includes a processing device and memory, such as storage device 104, or has access to a storage device 104, for storing classes/classifications that can be used by the violation determination device 106. The storage device 104 includes a repository, which stores at least one class 132 (and/or its associated descriptor) provided by the training device 102.

With continued reference to FIG. 4, the managed lane enforcement system 100 further includes the violation determination device 106 in communication with the storage device 104 and the image capture device 130. The determination device 106 is adapted to acquire captured image data 150 from the image capture device 130 positioned to view a lane of interest. In the discussed embodiment, the image capture device 130 can be the same camera used to capture training and test images, or it can be a different camera. Here, the camera based imaging system is proposed to capture frontal-view images a vehicle. However, the system can include additional cameras stationed view into the rear or the rear seating area of the vehicle or the license plate/bumper area.

Accordingly, the system includes at least one illuminator 156, which provides illumination that is not obtrusive to the driver but still enables robust capturing despite ambient light conditions. In one contemplated embodiment, a near infrared (NIR) illuminator 156 source is used having a wavelength greater than 750 nm. In another embodiment, a visible light illuminator is stationed to provide illumination without shining into eyes of the driver.

The exemplary determination device 106 includes, for example, a computer or microcomputer. The determination device 106 may be included as part of the image capture device 130 or it may be in communication with the image capture device 130. The determination device 106 includes a processor 134, such as a CPU, and a memory 136 for storing software modules executable on the processor of the CPU and at least one communication interface 138 including hardware and/or software suitable for providing wireless data communication with the storage device 104, the image capture device 130, and a graphical user interface (GUI) 140. The memory 136, processor 134, and communication interface(s) 138 can be similarly configured to memory 114, processor 112, and communication interface 120 of the training device 102. The exemplary software module includes an image localization module 142, which locates a windshield region (or desired side of the windshield region) of the vehicle in a captured image; an image representation determination module 144, which computes a descriptor of the windshield region for analyzing a cabin region of the vehicle using pixels of the image; and, a classification module 146, which classifies the captured image into a respective class. These modules 142-146 will be later described with reference to the exemplary methods of FIG. 5. The various components of the violation determination device 106 may be all connected by a bus 148.

With continued reference to FIG. 4, captured image data 150 may undergo processing by the violation determination device 106 and a classification 152 and/or evidence package 154 may be displayed to the user in a suitable form on the GUI 140 in communication with the determination device 106. The GUI 140 can include a display, for displaying information to users, and a user input device, such as a keyboard or touch or writable screen, for receiving instructions as input, and/or a cursor control device, such as a mouse, trackball, or the like, for communicating user input information and command selections to the processor 134.

In another embodiment, the information output from the determination device 106 can be provided to a user device 108, such as a computer belonging to an enforcement authority. The user device 108 can include a computer at a dispatch center, a smart phone belonging to an enforcement driver in transit (and capable of making traffic stops) or to a vehicle computer and/or GPS system that is in communication with the determination device 106.

Figure 5:
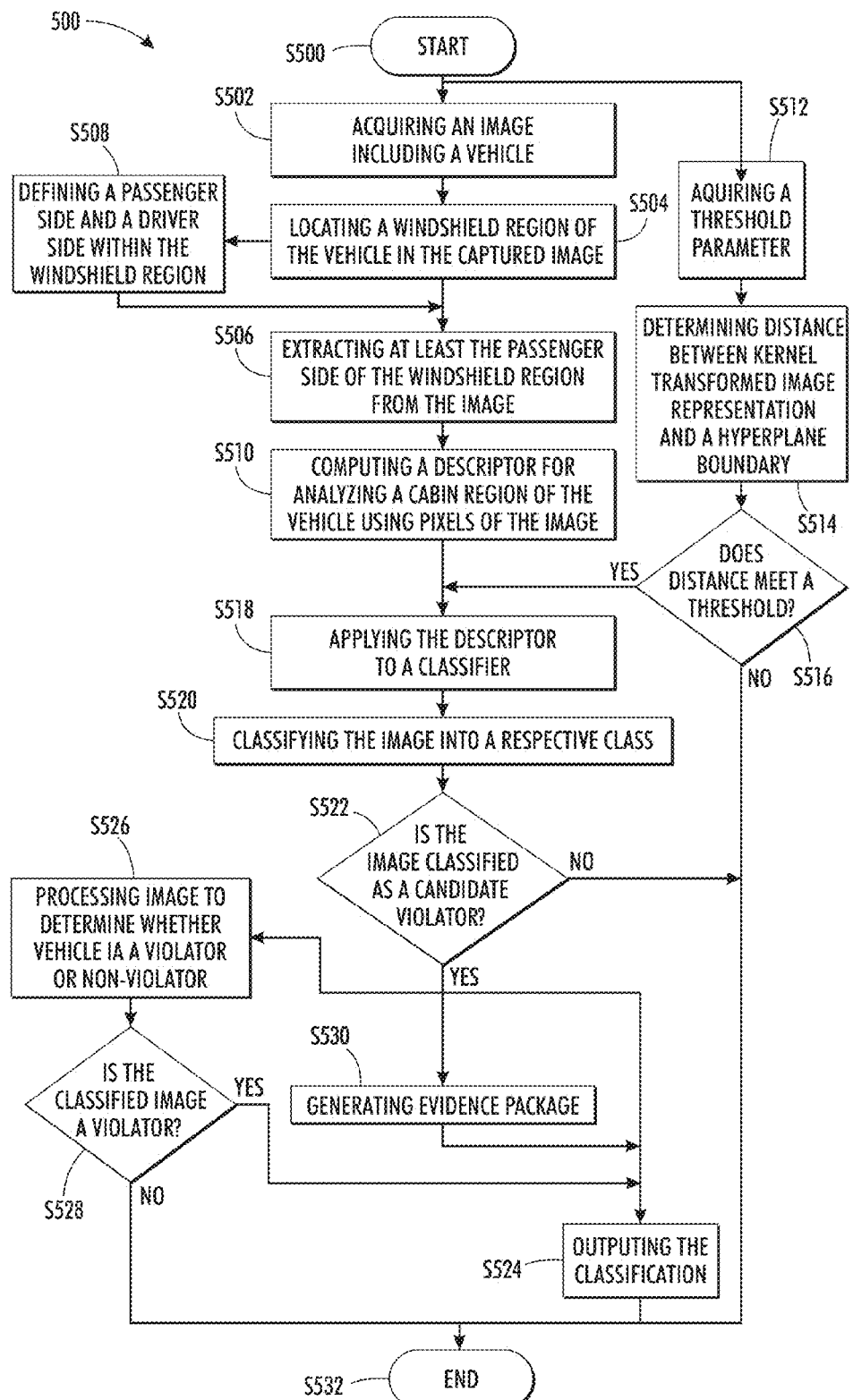
FIG. 5 is a flow-chart describing the method 500 for determining a managed lane violation according to one embodiment of the disclosure.

FIG. 5 is a flow-chart describing the method 500 for determining a managed lane violation according to one embodiment of the disclosure. The method starts at S500. The violation determination module 106 acquires an image including a vehicle from the image capture device 130 positioned to view oncoming traffic at S502. In one embodiment, the images can be acquired from the image capture device 130 in NIR. In this manner, a visible light filter can block ambient light in the visible wavelength range that falls on the camera lens. The use of artificial illumination is also provided by the illuminator 156 at least during periods where the conditions are dark, such as at night time or in inclement weather. The illuminator provides the artificial illumination in a spectrum that is not obtrusive to drivers.

The module 106 performs pre-processing on the image data to locate a windshield region of the vehicle captured in the image at S504. More specifically, the image localization module 142 performs windshield image localization using image processing or a machine learning approach based on object localization methods known in the art.

In practice, a camera field of view can be focused substantially at a desired level corresponding to an approximate estimation of the windshield region for triggering the disclosed determination process. However, the location of the windshield is only partially known by fixed camera-to-vehicle geometry. Different vehicle classes and types, such as trailers, trucks, vans, and large-to-mid-to-coup size vehicles, are all characterized by different lengths measuring between the respective nose and windshield of the vehicles. The size, pitch angle, and height of the windshields also vary between the different vehicle classes and types. Furthermore, the left-to-right displacement of the vehicle within a lane is not known a priori. The boundaries defining the windshield region in the image are not fixed between captured images.

Figure 6A:
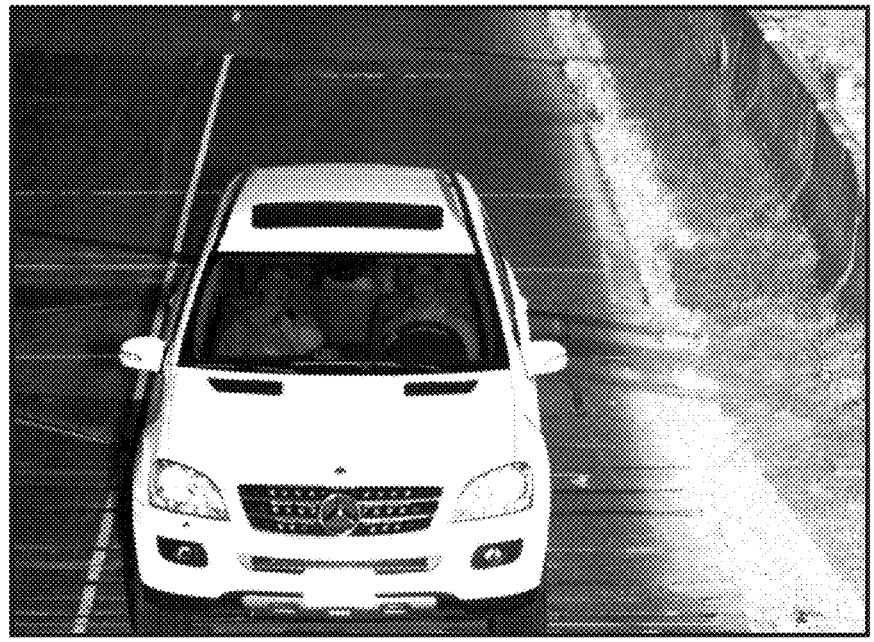
FIG. 6A shows an example of an image acquired by the system and including a frontal-view of an approaching vehicle.
Figure 6B:
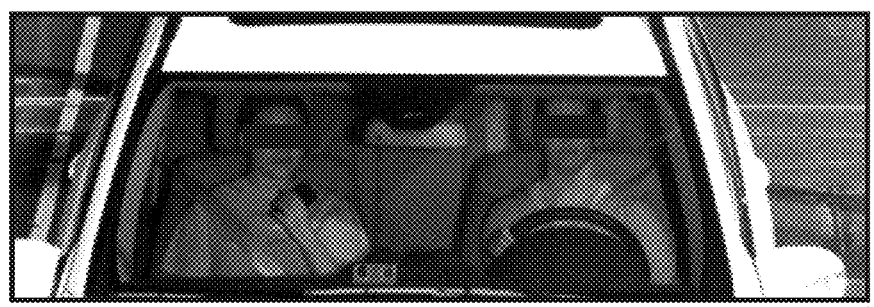
FIG. 6B shows a sub-image of a windshield region that was located and extracted from the image of FIG. 6A.

Therefore, the image can be pre-processed to extract the desired windshield region as a sub-image at S506. FIG. 6A shows an example of an image captured by the image capture device and including a frontal-view of the approaching vehicle. FIG. 6B shows a sub-image of the windshield region that was located and extracted from the image of FIG. 6A. Depending on the windshield localization process applied, the extracted windshield sub-image may be substantially rectangular or may be non-rectangular in shape.

In one embodiment, the sub-image can undergo further processing for determining a sub-region of the sub-image at S508. For example, after the windshield of the vehicle is located in the captured image, a passenger side and a driver side of the windshield region can be defined. Because every vehicle moving in a lane contains a driver controlling the vehicle, the system can assume that the vehicle contains at least one-occupant. Therefore, the system can operate on the assumption that there is an occupant seated in the driver seat and therefore analyze only a passenger sub-region of the cabin. In one embodiment, the module 142 can extract the passenger side of the windshield region from the image and eliminate the driver side as noise. In this manner, the system can be more discriminative of the violation determination based on the passenger area(s). The system 100 can therefore focus on the isolated windshield sub-image for determining the relevant differentiating characteristics between violators and non-violators without expending computational resource on extraneous features situated beyond the windshield area. The image localization module 142 transmits the sub-image to the image representation/descriptor determination module 144.

Module 144 applies an automatic detection algorithm to the sub-image (hereinafter also referred to as 'image') to determine whether the vehicle is a candidate offender of the managed lane regulation. Generally, module 144 computes an image representation(s). More specifically, the module 144 computes a descriptor for describing the cabin of the vehicle using pixels of the image at S510. Several embodiments are contemplated for computing a descriptor. One embodiment uses a global approach, which extracts a single descriptor for describing the localized image. A global distributor is computed from pixel statistics. Another embodiment contemplates a sub-image approach, which extracts local descriptors from small patch regions in the image. A single signature is aggregated from the patches for classification.

In the global descriptor approach, module 144 computes an image descriptor from the pixels so that the classification module 146 can perform a classification on the descriptor. In a conventional object recognition approach, parts of the image are searched for objects that can be associated with specific items. The objects are labeled as including, for example, a face, a seat, a seat belt, etc. The labels are then applied to a classifier for determining the number of occupants in the vehicle.

However, in the global approach, the module 144 defines a set of generic features that describe the entire image and not just parts (associated with objects and the location of objects) of the image. More specifically, the module 144 applies an algorithm that provides a feature vector describing the image data. In this manner, the computed feature vector can be used to classify the image without requiring the use of labels of objects.

In one embodiment, the module 144 is adapted to perform a Successive Mean Quantization Transform (SMQT) approach following the technique understood in the art. Generally, the SMQT process determines a feature vector for each pixel in the image by analyzing a vicinity of the pixel. More specifically, for each pixel that is analyzed, the pixel is designated as a center pixel in a vicinity/region. An average value (0-255) for the region is determined. This average is set as a threshold value. Then, the value of each pixel in the region (i.e., the center pixel and the surrounding pixels in the region) is compared to the threshold. The pixels are each assigned a binary value based on the comparison. For example, pixels having a value below the threshold may be assigned a "0" value and pixels having a value meeting or exceeding the threshold may be assigned a "1" value. For example, a 9-bit binary number is generated for a 3×3 vicinity of a pixel using the binary values of each pixel in the region. The binary number is converted to a decimal number. This decimal number is assigned to the center pixel. The process then generates a feature vector using the decimal numbers for each of the pixels in the image.

In the sub-image descriptor approach, the module 144 first identifies patch regions in the image. The module 144 then extracts descriptors from the patch regions. The patch descriptors are then aggregated into an image-level descriptor. Generally, the patch descriptors correspond to low-dimensional feature vectors and the image-level descriptor corresponds to a high-dimensional feature vector.

In another embodiment using the global descriptor approach, the module 144 is adapted to extract local patches and represent them with descriptors, following techniques understood in the art such as the SIFT.

In another embodiment using the global descriptor approach, the module 144 is adapted to perform a Histogram of Gradients (HOG) process following the technique understood in the art. Generally, the HOG approach compiles histograms for localized cell portions (i.e., spatially connected cell blocks/block regions) in an image. In one embodiment, the process can generate a histogram of gradient directions (and orientations) for pixels in the cell, although other descriptors can be used such as shape, texture, and color, etc. In other words, gradients are determined for each cell portion and the number of occurrences is counted. The combination of histograms (for all cell portions) is used to represent the descriptor. More specifically, the descriptor is generated as a feature vector representing the normalized histograms for all block regions.

In one embodiment using the sub-image descriptor approach, the module 144 is adapted to compute a Bag-of-Visual-Words (BOW) representation using a technique that is understood in the art. This technique consists in learning a set of patch prototypes by clustering the set of low-level descriptors. Given a new image, each of its patch descriptors is assigned to its closest prototype and the image is described by the histogram of the number of occurrences of each prototype.

In another embodiment using the sub-image descriptor approach, the module 144 is adapted to compute a Fisher Vector (FV) Representation using a technique that is understood in the art. This technique consists in learning a probabilistic model of the low-level descriptors using, for instance, a Gaussian Mixture Model (GMM). Given a new image, it is characterized by the gradient of the log-likelihood of the image descriptors on the GMM with respect to the model parameters.

In summary, the sub-image approach extracts multiple local descriptors from the windshield sub-image and then aggregates them into a sub-image-level global descriptor. Furthermore, because the system 100 is modular, it can use other features and types of kernels in the classifier for performing the above-mentioned algorithms. In yet another embodiment, a combination of the above approaches can be used. Computing the descriptor at S510 can also extend to multiband systems, where the sets of features from images from different bands can be combined. Regardless of the approach used, the module 144 transmits the descriptor/feature vector to the classification module 146.

The classification module 146 is adapted to classify the image into one of respective classes including at least classes for a violator and a candidate non-violator. One aspect of the present disclosure is that the classification module 146 is adapted to selectively perform the classification routine. In other words, the module 146 determines whether to classify or not classify the captured image based on a later-discussed sample distance of a kernel transformed image representation (hereinafter synonymously referred to as a 'kernel transformed descriptor' or a 'kernel transformed feature vector') to the hyper-plane boundary. This distance is subsequently compared to a threshold which is meant to balance yield and classification accuracy. An increase in the decision threshold will lead to a decrease in the yield but will typically lead to an increase of the accuracy. On the other hand, a decrease of the decision threshold will lead to an increase of the yield but will also typically lead to a decrease of the classification accuracy.

Continuing with FIG. 5, the system acquires a thresholding parameter at S512. As mentioned, this thresholding parameter is a minimum distance (and/or score) between the kernel transformed image representation and the hyper-plane boundary. The system determines the distance between the vehicle (and/or windshield region) kernel transformed image representation and the hyper-plane boundary at S514. The distance is compared to the threshold at S516. In response to the distance being below the threshold (NO at S516), the classification module 146 outputs no classification and ends at S532. In response to the distance meeting or exceeding the threshold (YES at S516), the module 146 applies the descriptor to the classifier at S518. Alternatively, the module 146 can compare the descriptor to the descriptors describing the classifications 132 in the storage module 132 at S518. The module 146 classifies the image into a respective class at S520. In the present disclosure, the class can include one of a violator, meaning that the vehicle has only one occupant while using a managed lane, or a candidate non-violator, meaning that the vehicle may have more than one occupant. However, one embodiment contemplates applying the disclosed process to a classification based on using the descriptor to rather count the number of occupants. This embodiment can be implemented by changing the classes (and/or a labeling system) of the training data.

The module 146 determines whether the image is classified as a candidate violator or a non-violator at S522. In response to the image being classified as a non-violator (NO at S522), the method can end at S532. In this manner, a violation can be issued only when one is detected by the algorithm. In response to the image being classified as a candidate violator (YES at S522), the module 146 can output the determination 152 at S524. The system can display at the determination device 106 and/or provide a user device 108 with a notice that a vehicle is a candidate violator. In this manner, the system cues a user, such as a traffic enforcement authority, to review the image. The user can therefore perform any subsequent action required to issue a ticket in response to manually affirming that a violation occurred. Alternatively, in response to the image being classified as a candidate violator (YES at S522), the module 146 can perform further analysis on the image at S526. The module 146 can perform further processing on the image to determine whether the candidate violator is in-fact a violator or a non-violator of the managed lane requirement.

The module 146 can determine whether the candidate violator is actually a violator at S528. In response to the image being a non-violator (NO at S528), the module 156 can end at S532. In response to the image being a violator (YES at S526), the system can display at the determination device 108 and/or provide the user device 108 with a notice that a vehicle is violating the managed lane requirement at S524.

In yet another embodiment, in response to the module 146 determining that the vehicle is one of a candidate violator or a violator (YES at S522 or S528), the system can generate an evidence package 154 at S530. An evidence package 154 may consist of information that can assist the user and/or traffic enforcement authority in identifying the vehicle for issuing a ticket. For example, the system can further analyze the pixels to generate a front seat image, a rear seat image, a license plate image, and a color vehicle image. In another embodiment, the system can use known processes of segmentation for identifying the license plate number on the vehicle.

In one embodiment, the evidence package 154 is provided to the user device 108 belonging to an enforcement authority. The enforcement authority can further examine the evidence to determine whether to perform a traffic stop and/or issue a ticket (after identifying the license plate) through the mail system without performing any actual traffic stop. It is further contemplated that the latter approach, of identifying the vehicle and issuing a ticket, can also be performed automatically by the system. The method ends at S532.

Figure 7:
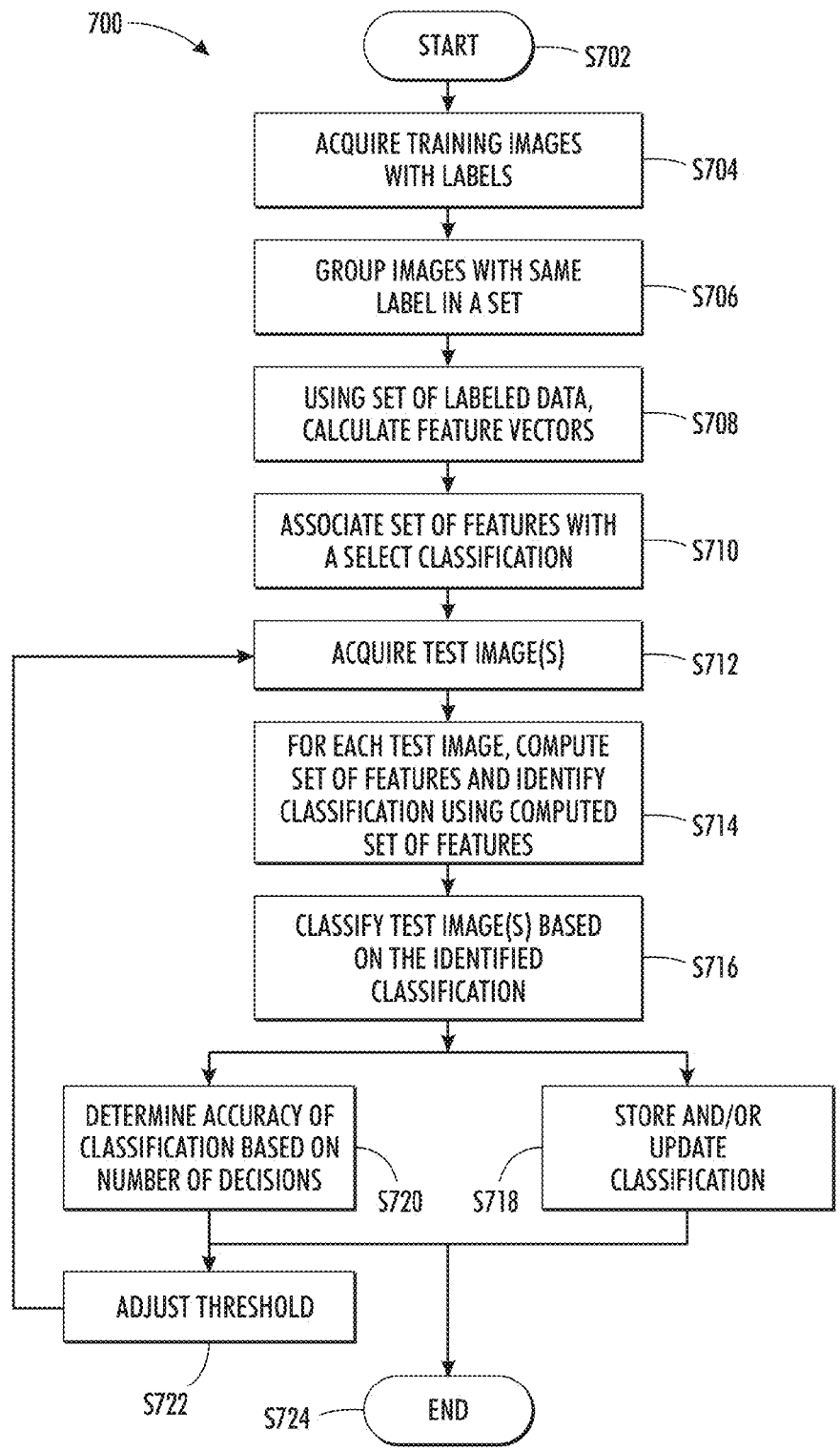
FIG. 7 is a flow-chart describing a method for training the classifier and/or training device of the system.

One aspect of the present disclosure is that it can determine violations at higher accuracy than in conventional approaches, such as object recognition and fuzzy neural classification. As mentioned, the system includes a machine learning classifier 102 for performing an on-line training of the feature vectors for use in the image representation process. FIG. 7 is a flow-chart describing a method 700 for training the classifier and/or training device 102. The method starts at S702. The classification generation module 116 acquires training images of vehicles from the image capture device or an input device at S704. The module 116 acquires the images with labels identifying each image as including a passenger occupant and not including a passenger occupant. The training images can be labeled with a "1" value in the case the vehicle is a violator and a "0" value in the case the vehicle is a non-violator. The training images are acquired as having generally forward-facing occupants, but images can also include other variations such as images having sideway-facing occupants and other occlusions. The module 116 groups the images having the same labels in a set at S706. The module 116 generates at least one descriptor/feature vector generally describing the set at S708. The module associates the descriptor/feature vector with a select class at S710. In the disclosure, the classes include a non-violator and at least one of a candidate violator and a violator.

Figure 8A:
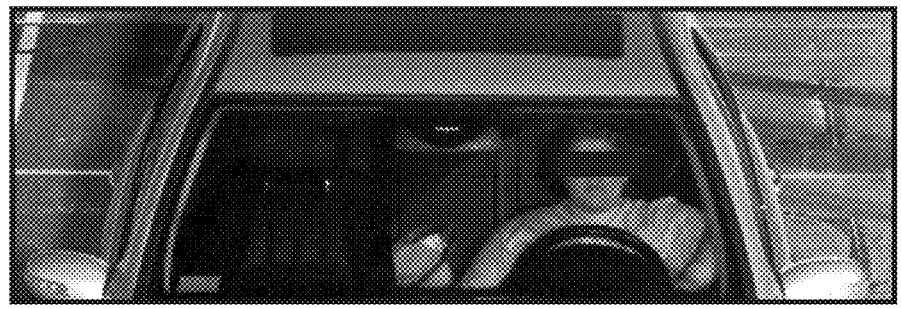
FIGS. 8A and 8B are example images acquired by the present system.
Figure 8B:

The accuracy determination module 118 acquires test images at S712, such as images shown in FIGS. 8A and 8B. For each test image, the module 118 determines a set of features and identifies a classification using the set of features at S714. Module 118 classifies the test image(s) based on the classification corresponding with the determined set of features at S716. The system can store and/or update the classifications at S718. One aspect of the module 118 is that it can further determine an accuracy of the classifications of test images at S720 and, as mentioned, selectively classify and/or update the classification of the image based on a select thresholding parameter. The accuracy is determined using the equation:

$$\text{Accuracy} = \frac{\# \ TP + \# \ TN}{\# \ TP + \# \ FP + \# \ FN + \# \ TN} \times 100 \qquad (1)$$

wherein TP denotes true positive, TN denotes true negative, FP denotes false positive, and FN denotes false negative. A true positive is defined as a correct classification of an image as belonging to a violator. A true negative is defined as a correct classification of an image as belonging to a non-violator. A false positive is defined as an incorrect classification of an image as belonging to a violator. A false negative is defined as an incorrect classification of an image as belonging to a non-violator. As mentioned earlier, the accuracy can be affected by the distance between the vehicle in the image and the hyper-plane boundary. Therefore, by selectively setting a minimum distance (i.e., threshold) for the vehicle distance, the accuracy can be controlled.

Figure 9A:
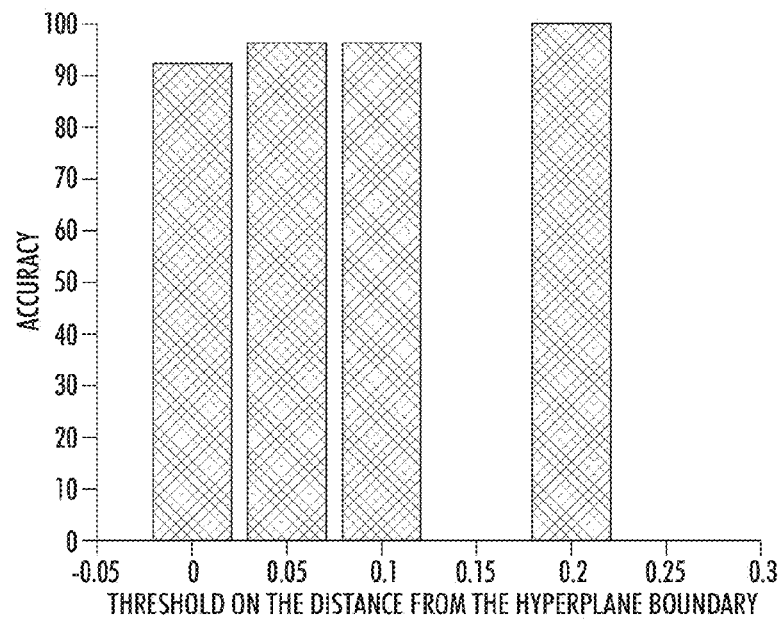
FIG. 9A is a graphical representation showing accuracy results obtained by varying a thresholding parameter in the present disclosure.

FIG. 9A is a graphical representation showing the results obtained using the (SMQT) process discussed above. As the figure illustrates, the classification accuracy is increased when the absolute value of the thresholding parameter is increased. This increase in accuracy is obtained at the cost of decreasing the yield when a distance that kernel transformed test image representations are situated to the hyper-plane boundary is below the threshold. The yield is the number of decisions made by the system divided by the total number of test images. The denominator in the accuracy formula is the number of decisions made.

Figure 9B:
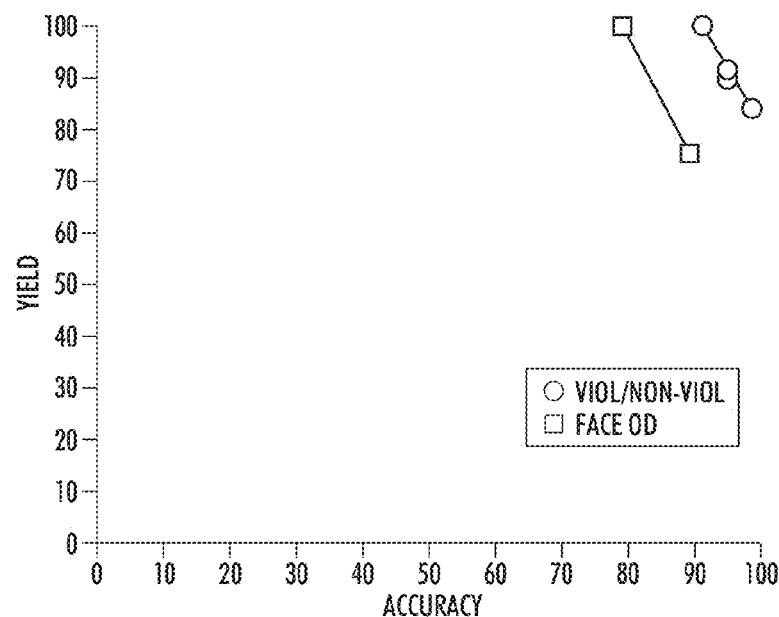
FIG. 9B is a graphical representation showing the relationship between accuracy and yield for the presently disclosed process and for a conventional object recognition approach.

FIG. 9B is a graphical representation showing the relationship between accuracy and yield for the presently disclosed process and for a conventional object recognition approach. As the figure illustrates, accuracy increases when the yield decreases, which in the present approach is made in response to an increase in the thresholding parameter.

Continuing with FIG. 7, after determining the accuracy at S720, the system can adjust the thresholding parameter at S722. This adjustment can be made in response to an acquired threshold that is provided by user input or automatically to a predetermined setting. After the threshold is adjusted for purposes of changing the accuracy, the system returns to S712 and repeats the process on subsequent images using the updated threshold. The method otherwise ends at S724.

One aspect of the present disclosure is that it uses a dataset describing the entire, desired windshield region. This dataset is more efficient than conventional methods, which perform detection by rather searching through the image for objects (s.a., faces, seats, and seat belts, etc.) with a fixed detection frame size and which perform these searches at several different image scales in order to find the objects. Furthermore, the present disclosure improves accurate detection for images having occlusions, such as, for example, when a face is occluded. Therefore, the present disclosure provides improved computation and accuracy requirements relative to the conventional approaches.

Another aspect of the disclosure is that it does not use an object-labeling system for determining a violator and non-violator. Conventional methods search for objects, such as by analyzing a facial region in a windshield, and then label the objects. The labeled objects are then used to count the number of occupants. The number of occupants is then used to determine whether the violation occurred. The present disclosure provides a less costly process because the ground truth is easier to label. The disclosure requires less training for different postures/profiles of faces.

Although the methods 500, 700 is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for detecting a vehicle occupancy violation, the method comprising:
   acquiring an image including a vehicle from an associated image capture device positioned to view oncoming traffic;
   processing pixels of the image for computing a feature descriptor describing a cabin region of the vehicle;
   determining a distance that the feature descriptor is positioned in a projected feature space relative to a hyper-plane;
   in response to the distance meeting and exceeding a predetermined threshold, applying the feature descriptor to a classifier for classifying the image into respective classes including at least classes for a candidate violator and a non-violator; and,
   outputting the classification.

2. The method of claim 1 further comprising:
   locating a windshield of the vehicle in the captured image; and,
   extracting the windshield region from the image and eliminating other regions.

3. The method of claim 1 further comprising:
   locating a windshield of the vehicle in the captured image;
   defining a passenger side and a driver side within the windshield region; and,
   extracting the passenger side of the windshield region from the image and eliminating the driver side.

4. The method of claim 1, wherein the processing the image is performed by a process selected from a group consisting of:
   a Successive Mean Quantization Transform (SMQT);
   a Scale-Invariant Feature Transform (SIFT);
   a Histogram of Gradients (HOG);
   a Bag-of-Visual-Words Representation;
   a Fisher Vector (FV) Representation; and,
   a combination of the above.

5. The method of claim 1 further comprising:
   before acquiring the image, training a classifier using at least a first sample image including a driver and a passenger occupying a vehicle and at least a second sample image including a driver and no passenger occupying the vehicle.

6. The method of claim 1 further comprising:
   in response to the vehicle being classified as a candidate violator, performing further processing on the image for determining whether the vehicle is one of a violator and non-violator.

7. The method of claim 1 wherein the outputting further includes:
   providing notice of a candidate violator to an associated user device.

8. A computer program product comprising non-transitory computer-readable recording media which encodes instructions for performing the method of claim 1.

9. A system for detecting a vehicle occupancy violation, the system comprising:

a determination device comprising memory which stores instructions for performing the method of claim 1 and a processor, in communication with the memory for executing the instructions.

10. A system for detecting a vehicle occupancy violation, the system comprising:
   an image capture module adapted to acquire an image including a cabin of a vehicle from an associated image capture device positioned to view oncoming traffic;
   a violation determination device adapted for processing the image, the device including:
      a feature extraction module adapted to compute from pixels of the image a feature descriptor describing a cabin region of the vehicle,
      a classifier adapted to:
         determine a distance that the feature descriptor is positioned in a projected feature space relative to a hyper-plane;
         in response to the distance meeting and exceeding a predetermined threshold, use the feature descriptor for classifying the image into respective classes including at least classes for a candidate violator and a non-violator,
      a processor adapted to implement the modules;
      a storage device adapted to store classifications associated with corresponding descriptors; and,
      a graphic user interface adapted to output the classification.

11. The system according to claim 10 further comprising an image capture device having near-infrared capability.

12. The system according to claim 10, wherein the feature extraction module is adapted to perform a process selected from a group consisting of:
   a Successive Mean Quantization Transform (SMQT);
   a Scale-Invariant Feature Transform (SIFT);
   a Histogram of Gradients (HOG);
   a Bag-of-Visual-Words Representation;
   a Fisher Vector (FV) Representation; and,
   a combination of the above.

13. The system according to claim 10, wherein the feature extraction module is adapted to:
   divide the image into sub-images;
   process each sub-image to determine low-level features representing each sub-image; and,
   concatenate the low-level features into a feature vector.

14. The system according to claim 10 further comprising a user device adapted to receive as notice the classification indicating that that the vehicle is a candidate violator.

15. The system according to claim 10, wherein the violation determination device is further adapted to:
   in response to the vehicle being classified as belonging to a candidate violator, perform further processing on the image for determining whether the vehicle is one of a violator and non-violator.

16. The system according to claim 10, wherein the outputting further includes:
   providing notice of a candidate violator to an associated user device.

17. The system according to claim 10 further comprising:
   a windshield localization module adapted to extract the windshield region from the image.

18. The system according to claim 10, wherein the classifier is adapted to:
   acquire a set of sample images including at least a first image of a vehicle with a passenger and a second image of a vehicle with no passenger;
   process the sample images for descriptors;
   associate each of the first and second images with the classifications; and,
   transmit the associations to the storage device for storing the classifications.

19. A system for detecting a vehicle occupancy violation, the system comprising:
   an image capture module adapted to acquire an image including a cabin of a vehicle from an associated image capture device positioned to view oncoming traffic;
   a violation determination device adapted for processing the image, the device including:
   a feature extraction module adapted to:
      process pixels of the image for determining a feature descriptor of the image, wherein the process is selected from a group consisting: a Successive Mean Quantization Transform (SMQT); a Scale-Invariant Feature Transform (SIFT); a Histogram of Gradients (HOG); a Bag-of-Visual-Words Representation; a Fisher Vector (FV) Representation; and, a combination of the above;
   a classifier adapted to:
      determine a distance that the feature descriptor is positioned in a projected feature space relative to a hyper-plane;
      apply the feature descriptor to a distance based thresholding parameter; and
      in response to the distance meeting and exceeding the distance based thresholding parameter, selectively classify the image;
   a processor adapted to implement the modules; and,
   a graphic user interface adapted to output the classification.

* * * * *